United States Patent Office 3,514,252
Patented May 26, 1970

3,514,252
PROCESS FOR THE PREPARATION OF STABILIZED ZIRCONIA POWDERS
Newton Levy, Jr., Ellicott City, and Milton C. Vanik, Severna Park, Md., assignors to W. R. Grace & Co., a corporation of Connecticut
No Drawing. Filed July 7, 1967, Ser. No. 651,667
Int. Cl. C22b 59/00; C01g 25/02
U.S. Cl. 23—22                                      6 Claims

ABSTRACT OF THE DISCLOSURE

Zirconia particles of sub-micron size stabilized in the cubic phase are prepared by mixing precursor solutions of zirconia and the stabilizer, coprecipitating the hydroxides, decomposing and grinding the hydroxides in a fluid energy mill operated at a temperature of 500° F. to 1400° F. The salt solutions or hydroxide slurries can be decomposed directly in the fluid energy mill.

This application relates to a process for preparing highly reactive, sub-micron sized, stabilized zirconia materials. In one specific aspect, it relates to the preparation of stabilized zirconia powders by thermally decomposing zirconium oxide precursors in the presence of stabilizing ions, such as calcium, magnesium, yttrium, etc. The product recovered is extremely homogeneous, is sinterable to high density, has a small grain size and is stabilized against disruptive phase changes during heating and cooling.

It has been shown that fine-sized powders exhibit unique properties when compared to powders of the same composition but of larger sizes. These small particles sinter to higher densities at lower temperatures, form solid solutions at lower temperatures and form strong ceramic bodies by virtue of their smaller grain size. Very pure powders with an average grain size of less than 1 micron are difficult to prepare by conventional techniques and are often prohibitively expensive in raw material and processing costs. The conventional wet chemical preparative techniques lead to problems in washing, filtering, drying, preventing agglomeration and comminuting the aggregates formed.

In addition, when a single phase, multi-component oxide powder is desired, the same problems exist with respect to the size and processing of the powders, along with difficulties in achieving stoichiometry and homogeneity. Co-precipitation or co-decomposition may yield powders with the desired properties, but these methods are limited in their application and quite frequently are economically unattractive.

The solid state reaction between two or more inorganic oxides is diffusion controlled. Thus, shorter diffusion paths lead to more homogeneous products with less severe heat treatments. One would expect the solid solution to be kinetically favored with extremely small particles in very intimate contact. The conventional method of physically blending and comminuting component oxides rarely produces sub-micron particles or homogeneity on a sub-micron scale.

Cubic zirconia is an excellent refractory material having the ability to withstand temperatures of about 4000° F. for extended periods of time. One of the problems encountered with pure zirconia, however, is that it undergoes undesirable phase changes during heating and cooling. These changes are accompanied by volume changes which crack, distort and destroy ceramic bodies containing the zirconia. Therefore, the zirconia must be stabilized with respect to phase changes. This stabilization is usually accomplished by the addition of stabilizing materials such as calcium, yttrium, magnesium, etc.

We have found that a homogeneous stabilized zirconia powder comprised of sub-micron sized particles may be prepared from a large number of starting materials to produce a variety of compositions. The processing generally involves no washing steps, and the end product is zirconia stabilized in the cubic phase. The product, as recovered, often does not require additional calcination or comminution.

The principle use of the product is in the preparation of refractory ceramics. The refractory ceramics prepared from our powders exhibit high densities, small grain sizes, a high degree of uniformity and temperature stability. The product can be heated to high temperatures without undergoing deleterious transformations.

In our novel process, zirconia precursors and the precursors of the salts added to stabilize the zirconia, are subjected to high temperature and rapid drying and/or decomposition.

Our novel process combines mixing, often in a hydrous oxide reactor, and drying and/or dehydrating in a high temperature fluid energy mill. The fluid energy mill is a standard article of commerce and is modified to operate at temperatures high enough to effect the necessary decomposition and/or dehydration of the zirconium and stabilizing oxide precursors to form cubic zirconia having sufficient stabilizing ion present to assure stabilization of the zirconia against phase changes. The feed for the mill may be prepared by:

(1) Mixing a zirconium nitrate and the nitrate of the stabilizing ion with water.
(2) Neutralization of mixed solutions of zirconium salts and salts of the stabilizing ions with ammonium hydroxide or ammonia gas.

The precursors may be nitrate, acetate, carbonate or other decomposible salt of zirconium and the stabilizing ions.

The stabilizing ions are added in a sufficient quantity to provide about 5 to 20 mole percent of the stabilizing oxide in the cubic zirconia product. The exact amount of the oxide precursor added depends on the stabilizer being used. Thus, zirconia can be stabilized with about 5 to 12 mole percent yttria, 15 to 30 mole percent calcium, 5 to 12 mole percent mixed rare earths, 15 to 30 mole percent magnesium, etc.

In one of the processes for preparing the feed, the hydroxides are precipitated from salt solutions with ammonia to form a hydrous oxide and ammonium salts. The ammonium salts are decomposed in the mill. The hydrous oxides are dehydrated and the product recovered. Certain limitations are applied to this and comparable systems.

In one satisfactory method, the precipitation is carried out in the device we designate a hydrous oxide reactor. This device is capable of producing instantaneous, homogeneous, finely-divided precipitates on a continuous basis. The equipment consists of metering pumps which deliver volumes of feed materials into a mixing chamber. The chamber is jacketed for heating and cooling and is equipped with a high speed stirrer. The entering fluids are ejected from nozzles into the chamber which has been designed to effect extremely rapid mixing in very short times. The concentration of the zirconium salt is from about 0.5 to 30 weight percent zirconia in the original solution. The stabilizing ion is normally added by mixing solutions of the salt of the stabilizing ion with the zirconium salt prior to addition of the ammonia.

After the precipitation, the slurries or hydrogels are fed to the mill at a rate sufficient to give the desired stabilized zirconia precursor or product.

When the slurry is fed to a steam operated 8-inch fluid energy mill, for example, it is conveniently fed at a rate of 50 to 300 ml. per minute, preferably about 120 to 220 ml. per minute. Solids, such as hydrated oxides, can be fed at rates of 50 to 300 grams per minute, preferably about 100 to 200 grams per minute.

The temperature of operation of the mill is determined by the desired surface properties of the powder. The mill is normally operated at a grind temperature of 500 to 1400° F., preferably about 800 to 1100° F.

Solutions may be milled directly using the same mill conditions.

One of the principal advantages of the process of our invention resides in the fact that the zirconia, as prepared, is in the cubic phase or readily convertible to the cubic phase, and is stable at temperatures up to about 4000° F. The zirconia can be sintered to high densities at temperatures several hundred degrees lower than is required when stabilized zirconia is prepared by other processes. The calcination temperature, of course, depends on the physical properties of the final products being prepared. Sintering temperatures of about 1000 to 2000° C. are operable with temperatures of 1200 to 1500° C. being preferred.

Our invention is further illustrated by the following specific but non-limiting examples.

Examples I, II and III illustrate the preparation of yttria stabilized zirconia by the high temperature milling of solutions.

EXAMPLE I

In the first of these runs, 4.07 kilograms of a commercial zirconium acetate solution was prepared to contain 22 weight percent zirconia. A yttrium nitrate solution (1.3 kilograms) was prepared to contain 8.1 weight percent yttria. The zirconium acetate and yttrium nitrate solutions were thoroughly mixed. The resulting solution was fed into a fluid energy mill using steam as the grinding medium. The material was fed at a rate of 100 ml. per minute, the mill was operated at a temperature of about 1000° F.

The product recovered was cubic zirconia with a surface area as measured by the well-known Brunauer-Emmett-Teller technique of 10 square meters per gram. The zirconia powder was cold pressed and sintered to greater than 90 percent theoretical density by heating at temperatures of 1100 to 1500° C. for a period of 2 to 16 hours.

EXAMPLE II

An aqueous solution containing approximately 16 weight percent salts (as oxides) and having a zirconium to yttrium mole ratio of 7.8 was prepared from the metal nitrates. The solutions were then steam milled at approximately the same conditions as above. The resulting powder was a cubic zirconia with a B.E.T. surface area of 20 square meters per gram. It was cold pressed into bodies for sintering. These bodies sintered to greater than 90 percent of theoretical density when heated at 1100 to 1400° C. for 2 to 16 hours.

EXAMPLE III

In this example, the zirconia was stabilized in the cubic phase with mixed rare earth oxides. A commercially available mixture of rare earths containing 65 weight percent yttria was dissolved in a nitric acid solution. This solution was then diluted with water and sufficient zirconyl nitrate was added to prepare a solution having a zirconium to stabilizing metal mole ratio of 7.8. The solution was then milled directly with steam in a fluid energy mill operated at temperatures of 700 to 1300° F. The resulting products were cubic zirconia with B.E.T. surface area of 10 to 20 square meters per gram.

It is obvious from the data presented in Examples I through III that a stabilized zirconia can be prepared from the decomposition of solutions in the fluid energy mill.

EXAMPLE IV

A series of runs were completed in which the zirconia and stabilizing additives were converted to the hydroxides which were then fed to the fluid energy mill.

In the first of these runs, a solution of commercial zirconium acetate containing 22 weight percent zirconia was mixed with a yttrium nitrate solution containing 8.1 weight percent yttria. The resulting solution was reacted with a quantity of 5 molar ammonium hydroxide in the hydrous oxide reactor described above. The pH of the effluent was maintained in the range of 4 to 10. The slurries were milled directly in a fluid energy mill operated at about 1000° F. The resulting powders were cubic zirconia with surface areas of 10 to 20 square meters per gram. The stabilized zirconias were sinterable to greater than 90 percent of theoretical density when heated at temperatures of 1100 to 1500° C. for about 2 to 16 hours.

EXAMPLE V

In this example, the conditions were exactly the same as in Example IV, except that the slurries were dewatered to a paste, air dried and fed to the fluid energy mill at a rate of about 100 grams per minute. The products recovered were analogous. The zirconias were sinterable to greater than 90 percent of theoretical density when heated at temperatures of 1100 to 1500° C. for 2 to 16 hours.

EXAMPLE VI

In this example, an aqueous solution containing about 16 weight percent solids (as oxides) and having a zirconium-yttrium mole ratio of 7.8 was prepared from zirconium nitrate and yttrium nitrate. The solution was reacted with 5 molar ammonium hydroxide solution in the hydrous oxide reactor. The effluent pH was 4 to 10. The slurries were fed to a fluid energy mill operated at about 1000° F. at a rate of about 125 cc. per minute. The products recovered were zirconium oxide in the cubic phase, having a surface area of about 10 to 20 square meters per gram. Cold pressed bodies of the zirconias were sintered to greater than 90 percent of theoretical density by heating to temperature of 1100 to 1500° C. for 2 to 16 hours.

EXAMPLE VII

This example illustrates the preparation of a calcium stabilized cubic zirconia.

A mixed solution of zirconium and calcium nitrates was prepared having a zirconium to calcium mole ratio of 5.6. This solution was reacted with about 5 molar ammonium hydroxide solution in the hydrous oxide reactor described above. A sufficient quantity of the ammonium hydroxide solution was added to maintain an effluent pH of 10. The slurry was hot air milled at a temperature of 800° F. The resulting product was a cubic zirconia with a surface area of about 10 square meters per gram.

EXAMPLE VIII

In this example, the zirconia stabilized with mixed rare earth oxides was prepared in the hydrous oxide reactor and the fluid energy mill. A commercial rare earth mixture containing approximately 65 weight percent yttria was dissolved in nitric acid solution. The solution was then diluted with water and sufficient zirconyl acetate was added to prepare a solution having a zirconium to stabilizing metal mole ratio of 7.8. This solution was reacted with 5 molar ammonium hydroxide solution in the hydrous oxide reactor. Sufficient ammonium hydroxide was added to maintain the effluent pH in the range of 9 to 10. The slurries were then milled directly in a fluid energy mill operated at a temperature of 700 to 1300° F. in the presence of steam. The products recovered were cubic zirconias having surface area of 10 to 20 square meters per gram. The stabilized zirconias were sinterable to greater than 90 percent of theoretical density at a temperature of 1100 to 1500° C. for 2 to 16 hours.

Obviously many modifications and variations of the invention may be made without departing from the essence and scope thereof and only such limitations should be applied as are indicated in the appended claims.

What is claimed is:

1. The process of preparing high purity bodies in the sub-micron size range stabilized in the cubic phase which comprises:
   (a) mixing solutions of acetates, carbonates, or nitrates of zirconium and yttrium, calcium, or rare earths;
   (b) co-precipitating the hydroxides with ammonia;
   (c) decomposing and grinding the co-precipitated hydroxides in the presence of air or steam in a fluid energy mill operated at a temperature of 500° F. to 1400° F.;
   (d) cold pressing the powder into the desired shape;
   (e) sintering to greater than 90 percent of theoretical density by heating to a temperature of 1100 to 1500° C. for 2 to 16 hours;
   (f) recovering the stabilized zirconia body.

2. The process according to claim 1 wherein the zirconia stabilizing additive is 5 to 30 mole percent of an ion selected from the group consisting of yttrium, magnesium, calcium and mixed rare earth ions.

3. The process according to claim 1 wherein the decomposition is effected by feeding the co-precipitated precursors into a fluid energy mill as slurries or solutions at a rate of 50 to 300 milliliters per minute.

4. A process for preparing high purity zirconia particles in the sub-micron size range stabilized in the cubic phase which comprises:
   (a) preparing solutions of acetates, carbonates, or nitrates of zirconium or zirconium hydroxide slurries containing 5 to 30 mole percent of yttrium, calcium, or mixed rare earth ions as salt solutions or hydroxide slurries;
   (b) decomposing and grinding said solutions or slurries in a fluid energy mill operated at a temperature of 500 to 1400° F. in the presence of air or steam;
   (c) recovering the high purity stabilized zirconia particles.

5. The process according to claim 4 wherein the slurries or solutions are fed to a steam operated fluid energy mill at a rate of 50 to 300 milliliters per minute.

6. The process according to claim 4 wherein zirconium and yttrium hydroxides are co-precipitated and the resulting slurry is fed at a rate of 100 to 200 grams per minute to a fluid energy mill operated at about 800 to 1100° F. in the presence of steam.

References Cited

UNITED STATES PATENTS

| 3,432,314 | 3/1969 | Mazdiyasni et al. | 106—57 |
| 3,247,000 | 4/1966 | Taylor | 106—57 |
| 3,259,585 | 7/1966 | Fitch et al. | 106—57 X |
| 3,303,033 | 2/1967 | La Grange et al. | 106—57 |
| 3,334,962 | 8/1967 | Clearfield | 23—140 X |

HERBERT T. CARTER, Primary Examiner

U.S. Cl. X.R.

23—24, 140